June 23, 1925.
C. J. CARLSON
AUTOMOBILE BODY
Filed March 3, 1924      4 Sheets-Sheet 1
1,542,854
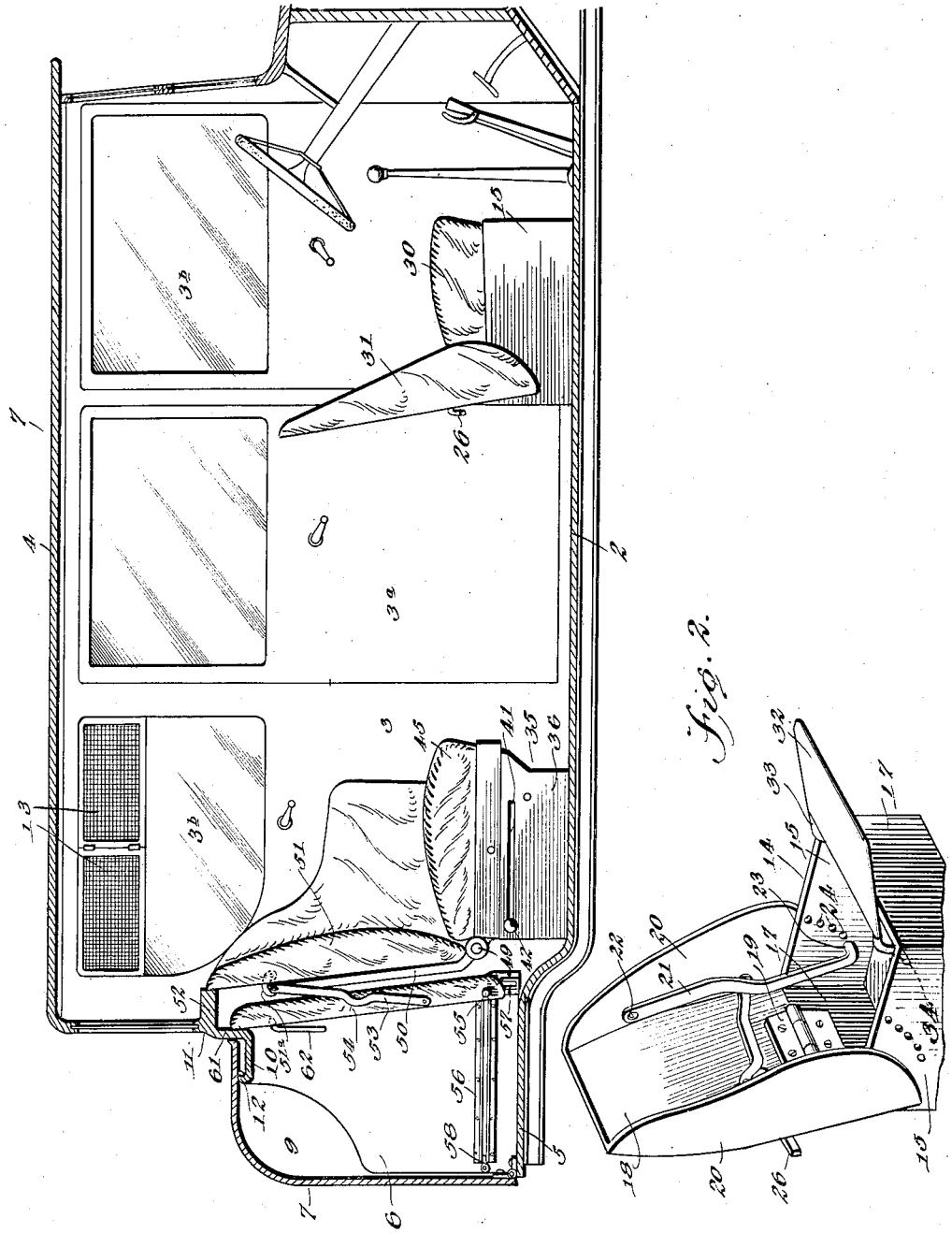
WITNESSES
INVENTOR
C. J. Carlson,
BY
ATTORNEYS June 23, 1925.
C. J. CARLSON
AUTOMOBILE BODY
Filed March 3, 1924
1,542,854
4 Sheets-Sheet 2
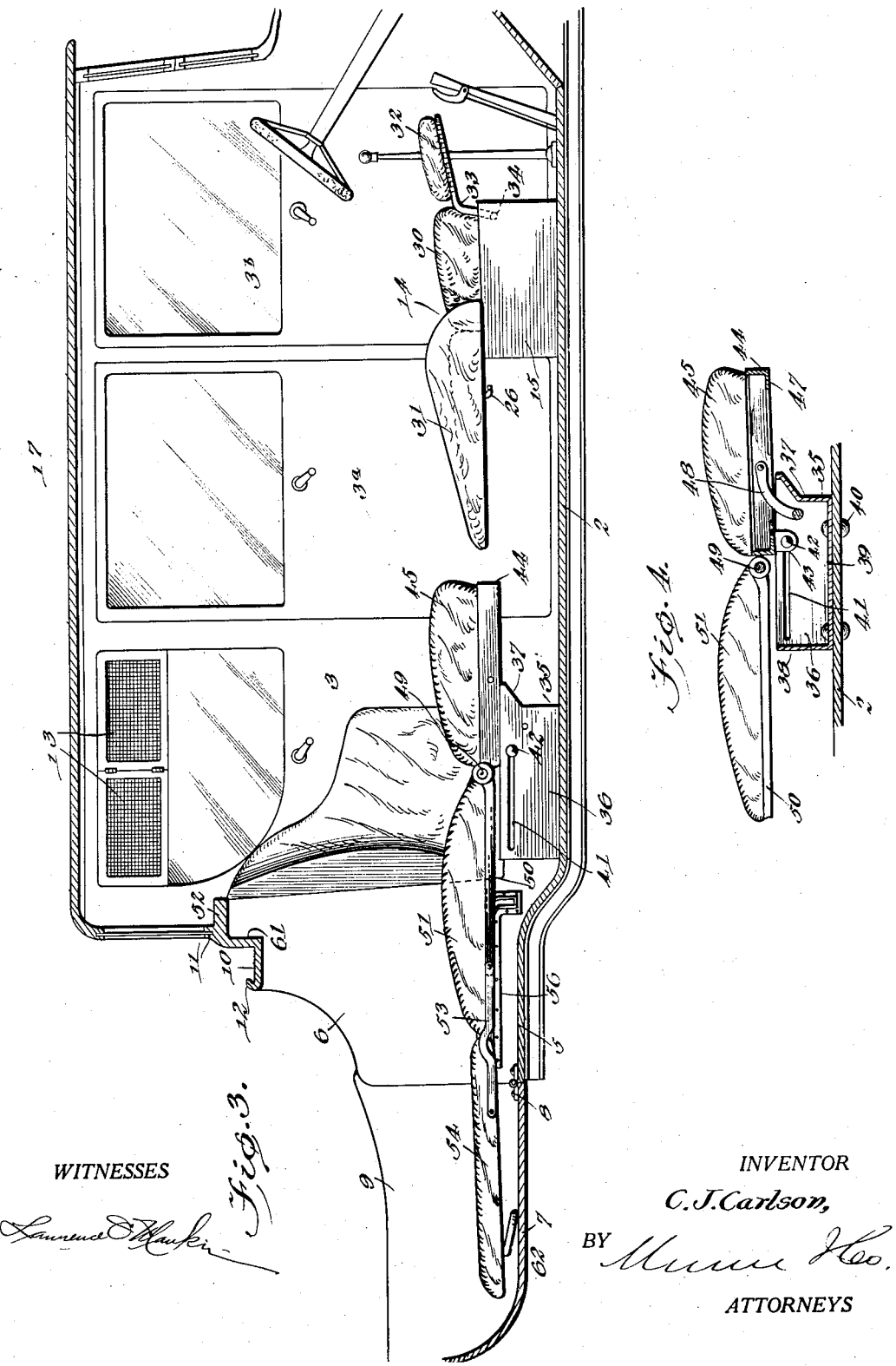
WITNESSES
INVENTOR
C. J. Carlson,
BY
ATTORNEYS

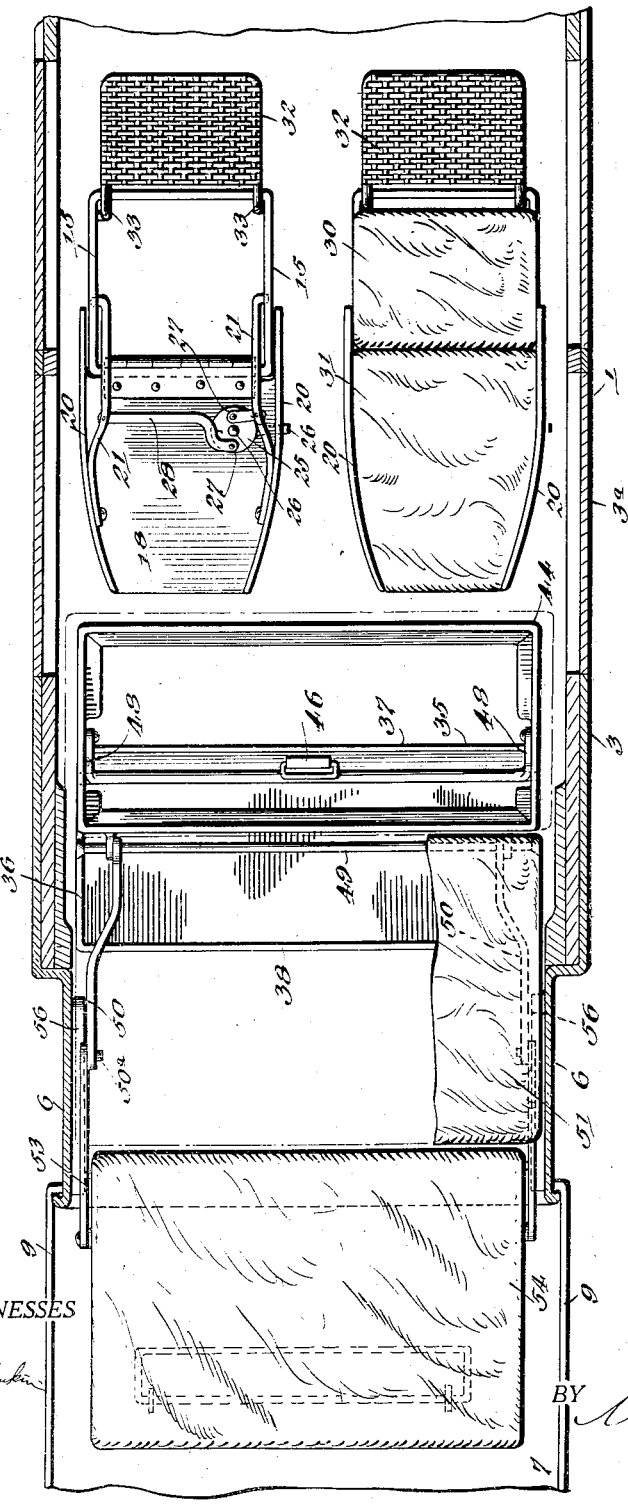

June 23, 1925.
C. J. CARLSON
AUTOMOBILE BODY
Filed March 3, 1924
1,542,854
4 Sheets-Sheet 4
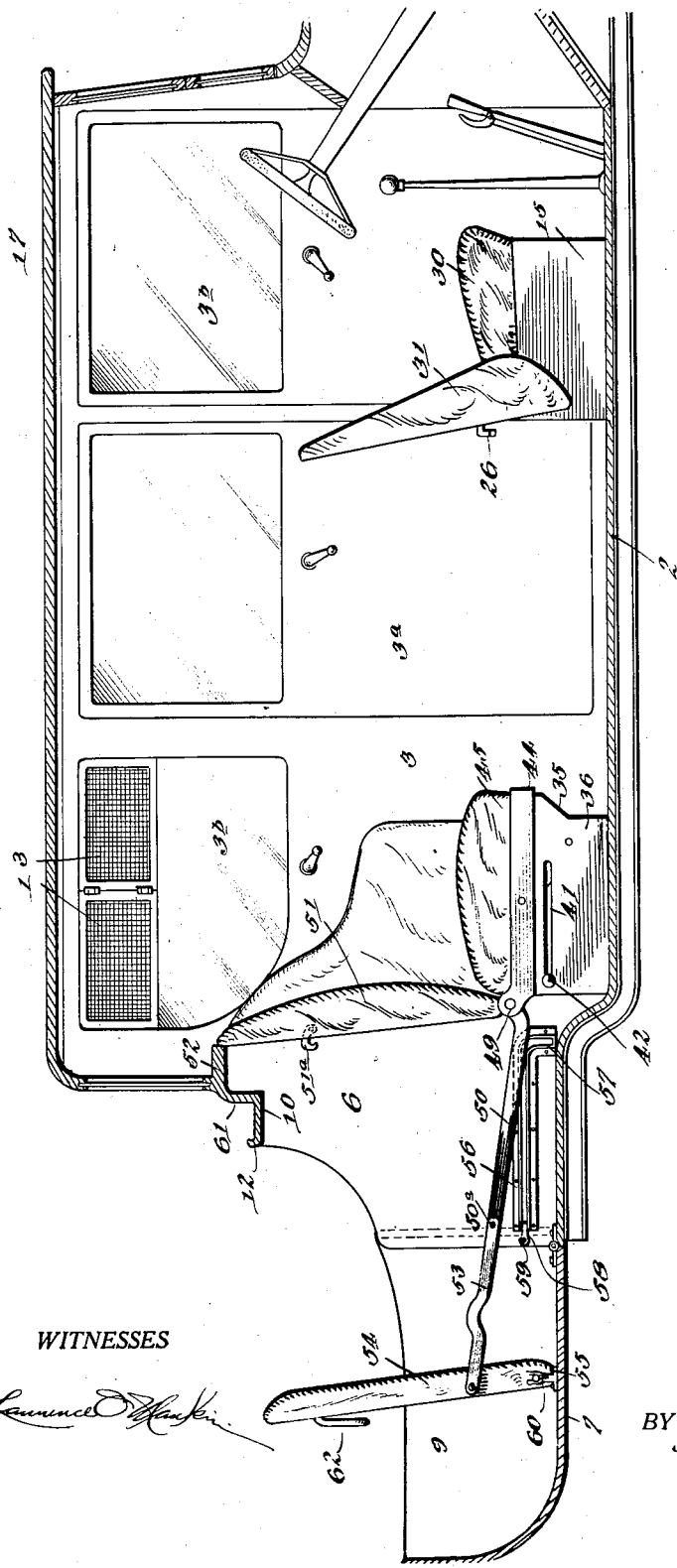
WITNESSES
INVENTOR
C.J. Carlson,
BY
ATTORNEYS Patented June 23, 1925.

1,542,854

UNITED STATES PATENT OFFICE.

CHARLES J. CARLSON, OF HELENA, MONTANA.

AUTOMOBILE BODY.

Application filed March 3, 1924. Serial No. 696,590.

*To all whom it may concern:*

Be it known that I, CHARLES J. CARLSON, a citizen of the United States of America, residing at Helena, in the county of Lewis and Clark, State of Montana, have invented certain new and useful Improvements in Automobile Bodies, of which the following is a specification.

My invention is an improvement in automobile bodies, particularly of the closed type of construction, and it consists in the combinations, constructions and arrangements of parts herein described and claimed.

An object of the invention is to provide an automobile body of the character described that is constructed in such manner that the seating capacity thereof can be increased beyond the normal at will.

A further object of the invention is to provide an automobile body of the character described in which the seats are adapted to be adjusted at will to provide comfortable beds for a plurality of persons.

A still further object of the invention is to provide an automobile body of the character described which is adapted to house and shelter a plurality of persons so that such persons may have comfortable seats and beds therein at different times and provision is made therein for the accommodation at all times of a considerable quantity of luggage.

Other objects and advantages will be apparent from the following description, considered in conjunction with the accompanying drawings, in which:

Figure 1 is a longitudinal vertical section through an automobile body embodying the invention, showing the front and rear seats therein in closed or normal position and a rumble frame or extension thereto and the rumble seat also folded or closed, Figure 2 is a perspective view of one of the front seats in partly opened out or extended position, the cushion of the seat being omitted, Figure 3 is a view similar to Fig. 1, showing the rumble frame in open or extended position and the front, rear and rumble seats opened out or extended to provide beds, Figure 4 is a horizontal vertical section through the rear seats in opened out or extended position, Figure 5 is a plan view, showing the structure exhibited in Fig. 4 with the cushion of the rear seat omitted and a portion of the back of the rear seat broken away to disclose the rear seat supporting and adjusting mechanism, and with the cushion and back of one of the front seats omitted, and Figure 6 is a view similar to Figs. 1 and 3, showing the front and rear seats in closed or normal position, the rumble frame open, and the rumble seat adjusted for co-operating with the rumble frame and the rear seat to retain luggage in the rumble frame.

In the drawings, an automobile body embodying the invention is indicated generally at 1. The body 1 may comprise a bottom or floor 2, sides such as that indicated at 3, including a door 3ª and windows 3ᵇ and a top 4. The bottom 2 has an upwardly offset extension 5 at its rear end co-operating with extensions as at 6 to the sides of the automobile body to provide the substantially U-shaped stationary or body section of a rumble frame. The latter also includes a cover section 7 which is shown as being attached by hinges 8 to the extension 5 and as having side portions, as at 9, adapted to straddle the extensions 6 when the rumble frame is closed, as illustrated in Fig. 1. The rumble frame may also include a horizontal extension 10 at the lower end of the rear end 11 of the body 1, the rear end 11 terminating at its lower end substantialy at the level of the upper end of the extensions 6 to the sides of the body 1 and the extension 10 being adapted to be overlapped by the normally upper end portion of the cover section 7 when the rumble frame is closed. The rumble frame may be releasably held in closed position by suitable fastening means, such as the upstanding rib 12 provided at the outer end of the extension 10 for frictionally engaging the overlapping portion of the cover section 7. The hinges 8 permit the cover section 7 to be swung from the closed position through approximately 90° to such position that the major portion of the cover section 7 will lie substantially in the plane of the extension 5 and will be retained in that position because of the engagement of the lower end of the cover section 7 with the outer end of the extension 5.

The sides of the body 1 may include screen ventilators, as at 13.

It is to be understood that the parts described so far may vary considerably in details of construction from those illustrated in the drawings and that the automobile body embodying the invention may in general conform substantially to the construction of a sedan, coupe, or other type of body.

Front seats, indicated generally at 14, are supported upon the floor or bottom 2 adjacent to the forward end of the latter. Each front seat comprises a box-like frame open at its upper end and including a pair of vertical side members 15 held in spaced parallel relation and connected by vertical end members 17. A back supporting member 18 is hingedly attached at its lower end, as at 19, to the rearward end member 17. The back-supporting member 19 has a pair of forwardly extending flanges 20 at the side edges thereof having the lower end portions thereof adapted to straddle the sides 15 when the back supporting member is in nearly upright or normal position, as illustrated in Figs. 1 and 2. The back supporting member is releasably held in adjusted angular relation to the seat supporting frame by a pair of spring latching members 21 each attached at its upper end, as at 22, to one of the flanges 20 against the inner wall of the latter and having an outwardly turned portion 23 at its lower end urged continuously against the inner wall of one of the sides 15 because of the inherent resiliency of the material of which the latching member is formed, the outwardly turned portion 23 thus being adapted to enter any one of the openings 24 of an arcuate series in the side 15 with which the latching member is associated and to engage with such opening to hood the back-supporting member against swinging about the axis of its hinge connection with the seat-supporting frame. A disk 25 secured at its center to the shank of a crank 26 that is journalled in an opening in the back-supporting member is carried at the inner end of the shank of the crank inwardly of the inner face of the back supporting member and is provided with diametrically opposites wrist pins 27 connected by links 28 and 29, respectively, to the respective latching members 21 midway of the length of the latter. The handle portion of the crank 26 is positioned rearwardly of the rear face of the back-supporting member and may be conveniently grasped and manipulated to effect rotation of the disc 25 and thus to cause the outwardly turned portions 23 of the latching members to be withdrawn from the openings 24 with which such outturned end portions may be engaged at any given time. The back-supporting member then may be swung to a desired angular relation to the seat supporting frame, between the position illustrated in Figs. 1 and 2 and the position illustrated in Figs. 3 and 5 and when the crank 26 is released, the outturned end portion 23 will engage openings 24 to releasably hold the back-supporting member in adjusted position in respect to the seat frame.

A removable seat cushion 30 may be disposed on the seat frame and a removable back cushion 31 may be disposed upon the back-supporting member between the flanges 20.

An auxiliary section 32 of each front seat includes a frame having rod-like side members 33 extending rearwardly of the section 32 between the sides 15 and having laterally turned end portions 34, respectively journaled in horizontally aligned openings in the sides 15, the section 32 being of less width and length than the seat frame and thus being adapted when the seat cushion has been removed to be swung from the position within the seat frame to position to extend across the upper edge of the front end member 17 forwardly of the seat frame, or vice versa.

The rear seat likewise comprises a box-like frame 35 comprising a pair of vertical side members 36, front and rear end members 37 and 38, respectively, and a bottom 39 secured at 40 to the bottom 2. The sides 36 are provided adjacent to their upper end with horizontal alined guide slots 41 in which work outwardly turned guiding and retaining pins 42 carried by lugs 43 depending from the sides of a member 44 for supporting a seat cushion 45, the lugs being located at the rearward ends of the sides of the seat cushion supporting member. The seat cushion supporting member 44 thus may be moved from position directly above and supported on the frame 35 to position in which the seat cushion supporting member extends forwardly of the frame 35 or vice versa. A friction latching member 46 carried by the front end member 37 at its upper end is adapted to engage with a rearwardly turned rib or projection 47 on the seat cushion supporting member 44 to releasably hold the latter directly above and supported on the frame 35.

Arcuate links 48 each pivotally attached at one end to one of the sides 36 and at its other end to the corresponding side of the seat cushion supporting member intermediate the length of the latter tend to stay the seat cushion supporting member to the frame 35 and permit movement of the seat cushion supporting member relatively to the frame 35 between the positions mentioned, the convexly curved faces of the links 48 being uppermost.

The seat cushion supporting member 44 carries a transverse shaft 49 which extends transversely thereof at the rear thereof. Two arms 50 respectively are pivotally attached at their normally lower ends to the shaft 49 adjacent to opposite ends of the latter and are adapted when in upstanding or normal position, as illustrated in Figs. 1 and 6, to aid in supporting a back cushion 51 that rests thereagainst and bears at its upper end against a rib or ledge 52 that extends inwardly from the rear end wall 11 at the lower end of the latter.

Each of the arms 50 is connected at its normally upper end by a link 53 to one side of a rumble seat 54 at a point nearer to the forward end of the latter than to the rearward end thereof. The rumble seat is provided at its normally front end with a pair of laterally extending pins, as at 55, each of which worms in a guideway 56 provided on the adjacent side 6 of the body of the rumble frame. Each guideway extends vertically upward from the inner end for a slight distance, as at 57, and then horizontally rearward for the remainder of its length. Each guideway is closed at its rearward end by a removable stop 58 which is secured by a screw 59 or like fastening device to the side 6 with which the guideway. The stop 58 normally prevents the pin 55 from moving out of the guideway at the rearward end of the latter but may be removed to permit the rumble seat to be moved rearwardly beyond the rearward ends of the guideways and positioned vertically edgewise upon the extended cover section of the rumble frame with the pins 55 resting in and embraced by upstanding clips 60 carried by the cover section of the rumble frame, as illustrated in Fig. 6.

From the foregoing description of the various parts of the device, the operation thereof may be readily understood. When only the normal seating capacity of the vehicle of which the body 1 is a part is to be utilized, the front seats will be arranged in folded or normal position as illustrated in Figs. 1 and 6, the rear seat likewise will be in folded or normal position, as illustrated in Figs. 1 and 6, the cover section 6 of the rumble frame will be closed, as illustrated in Fig. 1, the pivoted arm and link connections 56—53 will be folded and the rumble seat will be positioned at the inner part of the rumble frame close against the back cushion 50 of the rear seat and will be maintained in this position because of the engagement of the pins 55 with the horizontal portions of the guideways 56 at the inner ends of the latter in conjunction with the engagement of the then upper end portion of the rumble seat with the lower end portion 61 of the rear end wall of the body. At this time, the pins 42 at the sides of the rear seat cushion supporting member will be positioned at the rearward ends of the guide slots 41. Various articles of luggage may be carried within the rumble frame which when in closed position may resemble a trunk.

If desired, the rumble frame may be opened by swinging the cover section thereof to the position illustrated in Figs. 3, 5 and 6. The rumble seat may be moved forward from the position shown in Fig. 1 and then downward with the pins 55 moving in the vertical inner end portions of the guideways 56 until the then upper end of the rumble seat is lower than the horizontal extension 10. The rumble seat may then be swung rearwardly and downwardly about the axial line of the pins 55 and the rumble seat can be moved upwardly and then rearwardly without contacting at its upper end with the lower end portion 61 of the rear end wall of the body 1. If it is desired to use the rumble seat as a seat, it is swung to horizontal position and is supported in such position in spaced relation to the bottom of the body of the rumble frame by the conjoint action of the pins 55 which engage with the guideways 56 and a substantially U-shaped supporting member 63 which has the arms thereof attached to the rumble seat adjacent to its then rearward end and which depends from the then lower face of the rumble seat substantially at right angles to the general plane of the rumble seat. The member 62 may serve as a handle adapted to be grasped to conveniently move the rumble seat to adjust the position of the latter and also may serve as a support or rail to which various articles of luggage may be attached. The supporting member 62 may have limited swinging movement about the axial line of the connections of the arms thereof with the rumble seat 54, if desired.

The rumble seat may be positioned to act as a luggage retainer, as illustrated in Fig. 6.

In the event that it is desired to convert the rear seat and the rumble seat into a bed, the rear seat cushion 45 and the back cushion 51 are removed in the order named, the seat cushion supporting member 44 is disengaged from the latch 46 and the rear seat cushion supporting member is moved forward until the pins 42 are at the forward ends of the guide slots 41, the arm and link connections 50—53 are extended and the rumble seat is swung rearwardly to the position shown in Fig. 3. The back cushion 50 is replaced upon the arms and the seat cushion 45 is replaced upon the seat cushion supporting member 44. At this time, the arm and link connections 50—53 will rest upon the guideways 56 and will be held against swinging downward from the position illustrated in Fig. 3. It, therefore, will be manifest that the rear seat cushion 45, the back cushion 51 and the rumble seat 54 will lie in substantially the same horizontal plane and will provide a comfortable bed.

If additional sleeping accommodations are required, each of the front seats may be converted into a bed. This may be accomplished by operating the crank handle 26 to cause the latching members 21 to disengage openings 24 in the sides of the front seat supporting member, lowering the back supporting members to the position shown in Figures 3 and 5, then removing the front seat cushion and swinging the auxiliary section 32 from position within the seat supporting member to the position shown in Figs. 2, 3 and 5, and finally replacing the seat cushion, whereupon a bed of ample dimensions to accommodate a person of average size is provided, the auxiliary section 32 serving as a head-supporting section of the bed.

From the foregoing it will be observed that an automobile body embodying the invention affords facilities for sheltering and providing for the comfort of a relatively great number of persons in an automobile of given size, sleeping accomodations in ventilated and sheltered quarters being provided in the event that it is necessary or desired to remain in the automobile over night. Various articles, such as garment hangers, not shown, or other articles for the convenience of the occupants of the automobile body may be carried in the latter. The front seats may be supported to slide along the bottom 2 to desired position in respect to the operating mechanism of the automobile of which the body 1 is a part.

Obviously, the invention is susceptible of embodiment in forms other than that illustrated in the accompanying drawings and I, therefore, consider as my own all modifications and adaptations thereof that fairly fall within the scope of the appended claims.

It will be observed that the back cushion 51 carries pivoted latching hooks 51ª engageable with extending ends 50ª of the pivotal connections of the links 50 with the links 53, whereby the back cushion 51 will be held against falling forward in response to a jar caused by a sudden stop of the automobile. When the back seat arrangement is in the position shown in Fig. 6, the latches 51ª are disengaged from the pivot elements 50ª.

I claim:

1. In a vehicle body, a rumble frame at the rear thereof, said rumble frame comprising a body open at the front, rear and top thereof, a cover section swingable to and from position to close said body of the rumble frame at its rear and top, said body of the rumble frame having a pair of opposed guideways extending in the direction of length of the vehicle body, a rumble seat having laterally extending pins at one end working in said guideways, and other supporting means carried by said rumble seat adapted to engage with the body of the rumble frame to co-operate with said pins and guideways to support said rumble seat in horizontal position.

2. In a vehicle body, a rumble frame at the rear thereof, said rumble frame comprising a body open at the front, rear and top thereof, a cover section swingable to and from position to close said body of the rumble frame at its rear and top, said body of the rumble frame having a pair of opposed guideways extending in the direction of length of the vehicle body, a rumble seat having laterally extending pins at one end working in said guideways, and other supporting means carried by said rumble seat adapted to engage with the body of the rumble frame to co-operate with said pins and guideways to supporting said rumble seat in horizontal position, each of said guideways extending horizontally from its rearward end for the greater part of its length and having a downwardly extending vertical portion at its forward end, said rumble seat being adapted when said pins are positioned at the front ends of the horizontal portions of the guideways and the rumble seat is disposed vertically edgewise to engage at its then upper end with a fixed part of the vehicle body, whereby said rumble seat will be maintained in vertically edgewise position until said pins have been moved downward in the vehicle portions of said guideways.

3. In a vehicle body, a rumble frame at the rear thereof, said rumble frame comprising a body open at the front, rear and top thereof, a cover section swingable to and from position to close said body of the rumble frame at its rear and top, said body of the rumble frame having a pair of opposed guideways extending in the direction of length of the vehicle body, a rumble seat having laterally extending pins at one end working in said guideways, other supporting means carried by said rumble seat adapted to engage with the body of the rumble frame to co-operate with said pins and guideways to support said rumble seat in horizontal position, and removable stops closing the guideways at their rearward ends and normally preventing said pins from moving out of engagement with said guideways at the rearward ends of the latter.

4. In a vehicle body, a rumble frame at the rear thereof, said rumble frame comprising a body open at the front, rear and top thereof, a cover section swingable to and from position to close said body of the rumble frame at its rear and top, said body of the rumble frame having a pair of opposed guideways extending in the direction of length of the vehicle body, a rumble seat having laterally extending pins at one end working in said guideways, a rear seat in said vehicle body, said rear seat including a fixed frame, a member for supporting a seat cushion, said seat cushion supporting member being slidable in the direction of length of the vehicle body, pivoted arms attached to said seat cushion supporting member and adapted to support a back rest, and links connecting said arms to said rumble seat.

5. In a vehicle body, a rumble frame at the rear thereof, said rumble frame comprising a body open at the front, rear and top thereof, a cover section swingable to and from position to close said body of the rumble frame at its rear and top, said body of the rumble frame having a pair of opposed guideways extending in the direction of length of the vehicle body, a rumble seat having laterally extending pins at one end working in said guideways, a rear seat in said vehicle body, said rear seat including a fixed frame, a member for supporting a seat cushion, said seat cushion supporting member being slidable in the direction of length of the vehicle body, pivoted arms attached to said seat cushion supporting member and adapted to support a back rest, and links connecting said arms to said rumble seat, said arm and link connections being adapted to rest upon said guideways when in horizontal position.

CHARLES J. CARLSON.